Feb. 15, 1966  R. G. NICHOLS  3,235,168
CONTAINERS
Filed Dec. 2, 1963
3 Sheets-Sheet 1
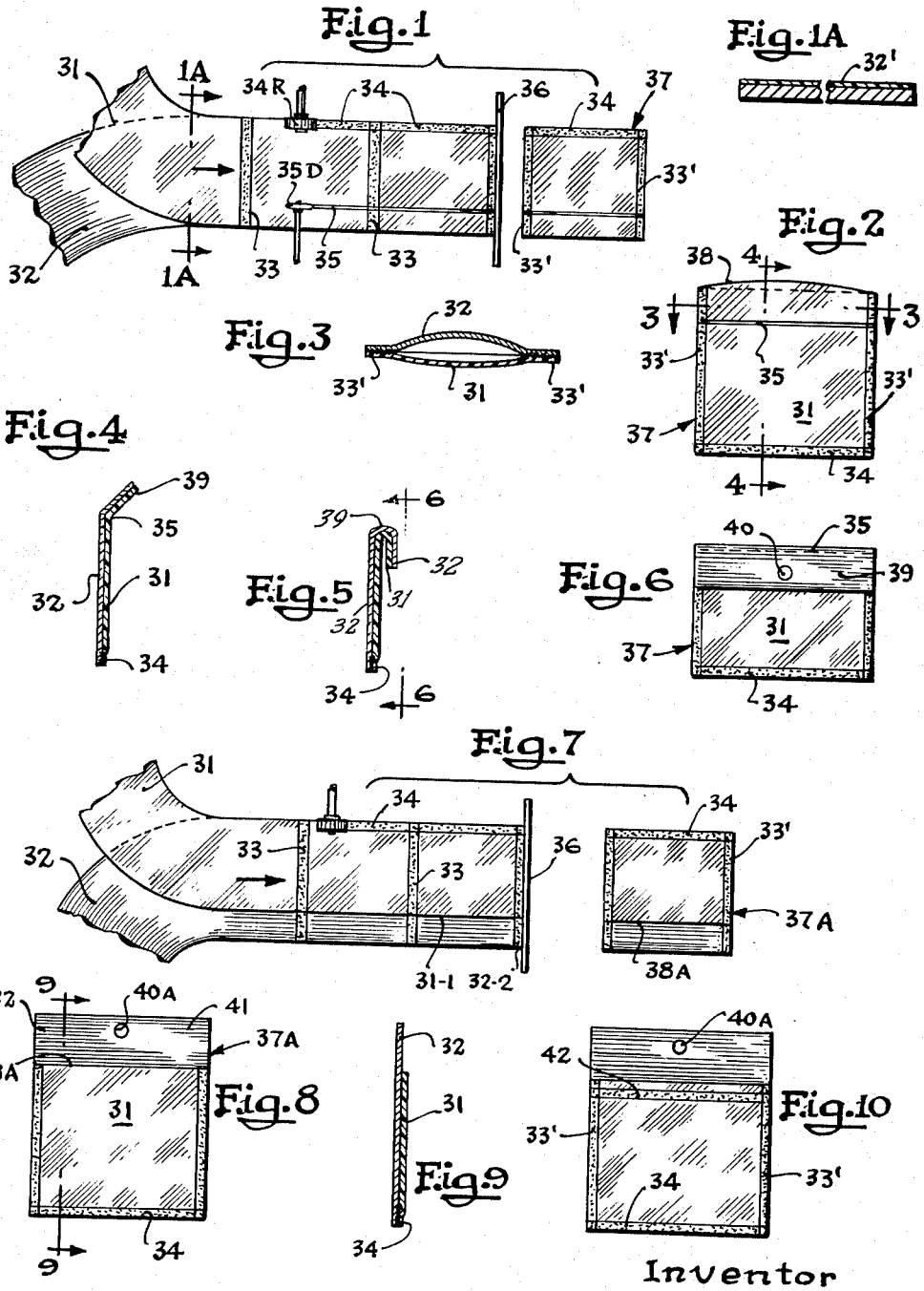
Inventor
Robert G. Nichols
By Wallace, Kinzer and Dorn
Attorneys

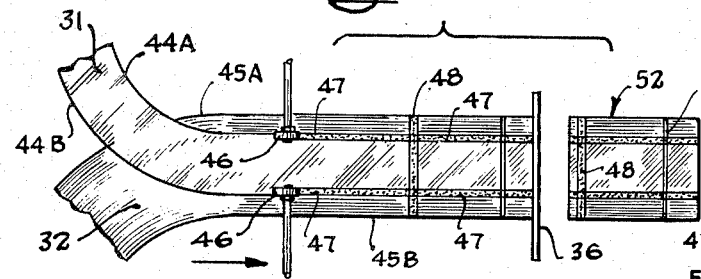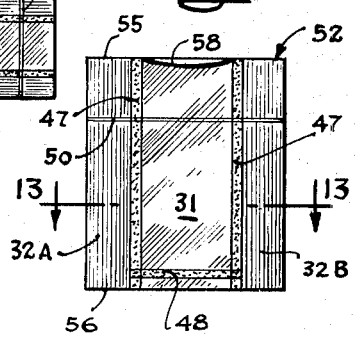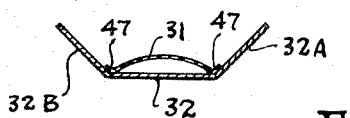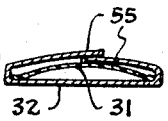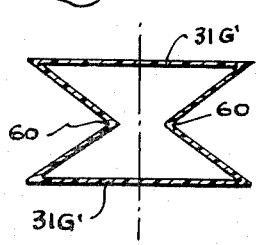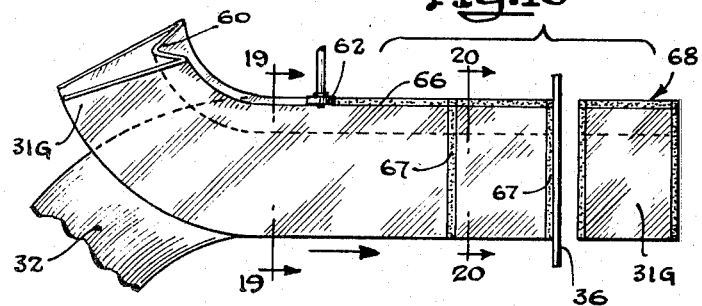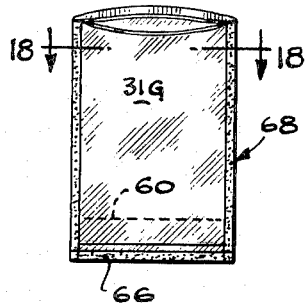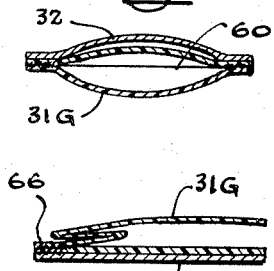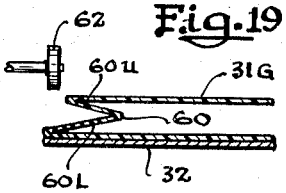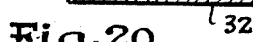
Inventor
Robert G. Nichols
By Wallace, Kinzer and Dorn
Attorneys

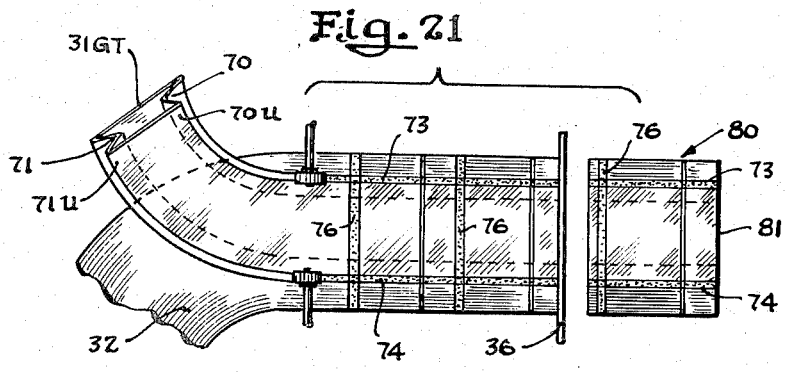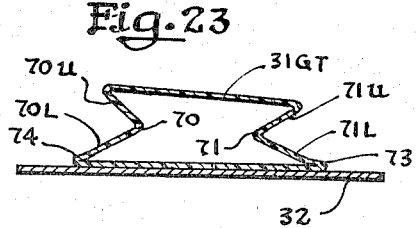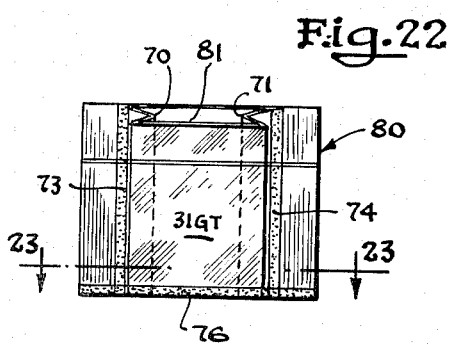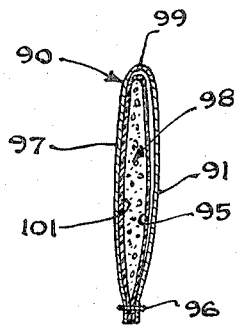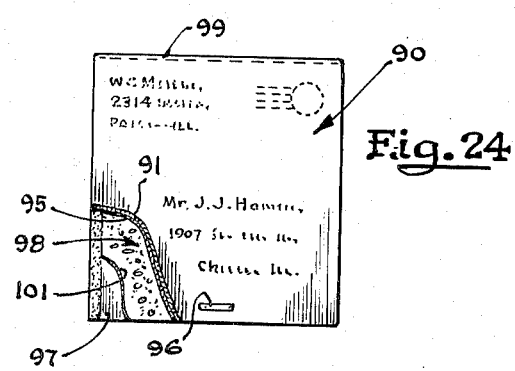

United States Patent Office 3,235,168
Patented Feb. 15, 1966

3,235,168
CONTAINERS
Robert G. Nichols, 211 Skyline Drive, Barrington, Ill.
Filed Dec. 2, 1963, Ser. No. 327,417
6 Claims. (Cl. 229—55)

This application is a continuation-in-part of co-pending application Serial No. 212,197 filed July 25, 1962, entitled Containers, now abandoned.

This invention relates to a container and to a process for producing the container in which two separate materials are sealed together to form the envelope portion of the container, the first one of the materials being a thermoplastic plastic film of flimsy nature such as polyethylene or polypropylene, and the second one of the materials being a more rigid material. The second material may be treated to facilitate the bonding of the two materials, and an example of this is paperboard as the second material, itself laminated or coated with polyethylene prior to heat sealing the same to a sheet of polyethylene film as the first material.

Thus, an example of a container produced under the present invention would be one in which the first material is polyethylene film and the second material is paperboard having a coating of polyethylene. The first and second materials are in the form of webs arranged in face-to-face position and may be so dimensioned and cut as to produce containers having two sheets of unequal dimension. The first material may include a gusset, and the second material may be scored. The second material is arranged so that the side bearing the polyethylene coating is juxtaposed on the first material for face-to-face sealing.

When so arranged, the first and second materials are sealed together, preferably by two spaced heat seals made transversely across the webs of the first and second materials perpendicular to the free edges of said webs.

Where the first material does not include a gusset end, the first and second materials are preferably sealed along one of the free edges or edge extremities, this further seal running the full distance between said perpendicular seals to provide the envelope or pocket portion of the container, sealed on three sides with the fourth or unbonded side providing the open end of the container or bag.

Such constructions represent objects of the present invention.

In its broadest definition, the container of the present invention is one in which the second material is sealed to the first material along three marginal edge portions with a fourth edge free to enable the resultant pocket to be filled; more specifically, the second or more rigid material is preferably wider or longer than the first material (the thermoplastic film) and is scored by pressure or by heat to enable the same to be bent for various different purposes hereinafter specified. Additionally, the first material may include a gusset bottom or gusset side, and the second or more rigid material may be deformed by heat to afford a pocket substantially complemental to the goods to be packaged. Such constructions amount to other objects of the present invention, and another object is to enable a stand-up display to be realized in the container of the present invention.

A further object of the invention is to achieve a small substantially flat bag or container having the advantageous characteristics of being readily processed through automatic mailing machines, and of having sufficient strength to withstand processing through automatic mailing machines and to withstand delivery through the mails. In addition, the flat bag produces an impact or noticeability response in the receiver when a fold-over flap is opened to expose the goods to the receiver. More specifically, under this object of the invention, a generally flat bag is formed from a first and second material with a folded-over portion, that is, a flap portion of the second material adapted to be secured to said first material to at least partially protect and conceal the goods disposed in the bag and to afford an addressing portion on the bag.

Under a further object of the invention, the flap or cover portion of the second material is of sufficient length to completely cover the goods disposed in the bag and is of a material of paperboard or the like, which is more readily printed upon by conventional automatic addressing machines than is the thermoplastic film constituting the first material. Thus, folded-over flap of second material protects the goods in the container, affords an addressing portion and conceals the identity of the goods until the protective flap is torn loose by an addressee to disclose the packaged goods.

Other and further objects of the present invention will be apparent from the following description and claims and are illustrated in the accompanying drawings which, by way of illustration, show preferred embodiments of the present invention and the principles thereof and what are now considered to be the best modes for applying these principles. Other embodiments of the invention embodying the same or equivalent principles may be made as desired by those skilled in the art without departing from the present invention.

In the drawings:

FIG. 1 is a diagrammatic view illustrating the production of a container of the kind illustrated in FIG. 2;

FIG. 1A is a sectional view on an enlarged scale on the line 1A—1A of FIG. 1;

FIG. 2 is a view illustrating a container produced by the procedure shown in FIG. 1;

FIG. 3 is a sectional view on the line 3—3 of FIG. 2;

FIG. 4 is a sectional view on the line 4—4 of FIG. 2;

FIG. 5 is a sectional view similar to FIG. 4 showing a different stage of completion of the container;

FIG. 6 is a plan view taken on the line 6—6 of FIG. 5;

FIG. 7 is a diagrammatic view illustrating another method of production to produce the container of FIG. 8;

FIG. 8 is a view illustrating a container produced by the procedure of FIG. 7;

FIG. 9 is a sectional view on the line 9—9 of FIG. 8;

FIG. 10 is a view illustrating one way in which the container of FIG. 8 may be completely sealed;

FIG. 11 is a diagrammatic view illustrating another procedure of manufacture under the present invention;

FIG. 12 is a view on an enlarged scale of a container produced by the procedure of FIG. 11;

FIG. 13 is a sectional view on the line 13—13 of FIG. 12;

FIG. 14 is a view similar to FIG. 13 but illustrating another modification;

FIG. 15 is a sectional view of the original form of tubing of which half is used in the procedure of FIG. 16;

FIG. 16 is another procedure for producing containers or bags under the present invention;

FIG. 17 is a view of a container produced in accordance with the procedure of FIG. 16;

FIG. 18 is a sectional view on the line 18—18 of FIG. 17;

FIGS. 19 and 20 are sectional views illustrating stages of production of the container of FIG. 17;

FIG. 21 is a diagrammatic view illustrating another method of manufacture under the present invention;

FIG. 22 is a view of a container produced in accordance with FIG. 21;

FIG. 23 is a sectional view on the line 23—23 of FIG. 22;

FIG. 24 is a front view of the container having a flap of second material disposed over the first material and secured thereto at the bottom of the container; and FIG. 25 is a side view of the container of FIG. 24.

The container illustrated in FIGS. 1 to 6 is one wherein the first and second materials are sealed together by two seals made transversely across the webs of the first and second materials perpendicular to the free edges of said webs. The materials are scored to provide a flap. The first and second materials are further sealed along one of the free edges, this further seal extending betwen and to each of said perpendicular seals to provide a container pocket sealed on three sides with the fourth or unbonded side providing the open end of the container or bag.

Thus, FIG. 1 illustrates one method of manufacturing a container under the present invention in which 31 represents the first material, which is polyethylene film or equivalent thermoplastic film, and 32 represents the second material which is paperboard more rigid than the film 31. Referring to FIG. 1A, the material 32 bears a coating 32′ of polyethylene to facillitate bonding of the material 32, by a heat seal, to the material 31. This is true of all the modifications hereinafter described, and is to be understood in the description to follow.

The first and second materials are initially in web form, being supplied from supply rollers, not shown. Spaced cross seals 33 unite the materials 31 and 32 transversely across the webs, such being effected as by heat seal rollers, not shown, although a like roller 34R completes a continuous heat seal 34 along the length of the web materials perpendicular to each of said cross seals. The seal 34 represents the bottom seal of the finished container as will be evident hereinafter.

A knife 36 severs the cross seals 33 approximately in half so that each half becomes a sealed edge 33′ of another and completed container.

A completed container is identified by reference character 37, such having an open end 38, FIG. 2, enabling the resultant pocket encompassed by the heat seals to be filled. It may be here mentioned that the free edge of the stiffer material 32 at the open end of the bag facilitates peeling back the free edge of the thin, adherent film 31 (see FIG. 3) to expose the interior of the envelope area for filling. After filling, the free or remaining unbonded edges of the sheet 31 will be heat sealed to the sheet 32 in the manner evident from FIG. 10 hereinafter discussed.

Either or both of the first and second materials may be printed with an advertising message or other such information, and the second material, of paperboard or like material capable of holding a crease, is scored for subsequent folding. An example of this would be that in the above described container or bag generically defined as having three sealed edges and a fourth open end, the second material is to have a score line formed therein parallel to the open end of the bag or receptacle. The dimension separating the open end and the score line may be of any desired distance; then, after the container is filled with a product, the first and second materials are folded at the score line to close the open end of the container. After folding, the fold may be secured in an ultimate position by means of stapling or sealing. A hole may be punched through the folded portion for hanging the filled container for display.

Thus, a scoring disc 35D, FIG. 1, is provided to produce a score line 35 parallel to the seal 34, somewhat inward of and parallel to what will be the open end of the resultant containers for reasons to be explained.

FIGS. 4 to 6 illustrate this in connection with the score line 35. Thus, by providing such a score line as 35, this produces in effect a flap 39 which can be accurately folded along the score line 35 to enclose the contents. The folded-over flap 39 (front or back) can be secured to the adjacent material of the container in any desired manner, and the container may be provided with an opening 40 therethrough at the flap to enable the container 37 and its contents to be displayed on a hook.

By omitting the seal 34, but nevertheless slitting the seals 33 in half as above described, the result is containers having two open ends, and which containers can be filled and the free ends of the film then tucked inward. It can be seen that this procedure affords an inexpensive container but one which can be used attractively to display goods.

Another variation of the present invention, FIGS. 7 and 8, is one in which the first and second materials are arranged in face-to-face position with three equal or colineal edge extremities, but the fourth edge of one of the materials extends beyond the corresponding edge of the other to any desired extent. The first and second materials used for this container are then bonded in the same manner previously described to provide a container bonded on three sides with a fourth open side or end. In this example, the fourth or open side is that side having the unequal edge extremities. If polyethylene as the first material has its fourth edge extended beyond the fourth edge extremity of the second material represented by paperboard, the free polyethylene portion may be used as a tuck-in flap after filling the bag, or as a fold-over flap to envelop the open end by folding the same over to the reverse side of the second material and affixed in this position by stappling or sealing.

If paperboard, used for the second material, has its fourth edge extended beyond the fourth or unbonded edge of the first material, the extended portion may be scored to form a tuck-in flap or fold-over flap as aforesaid. After folding, the paperboard flap may be affixed in its folded position by stapling or sealing, after filling.

Thus, FIG. 7 illustrates the formation of a container in which the first and second materials 31 and 32 for a corresponding bag 37A are of unequal width compared to one another, and although not indicated, it can readily be seen that the second material 32 can be scored as in FIG. 1 for subsequent folding as in FIGS. 4 and 5.

The webs 31 and 32 are arranged so that the two are colineal along one edge as shown in FIG. 7, with their respective other edges 31–1 and 32–2 spaced one from another but parallel. In this instance, the web 32 is the wider one.

Heat seals 33 and 34 are produced as described above in FIG. 1, and a cutter 36 is active to sever in half the seals 33 to produce containers 37A having open ends 38A and a flap 41 which extends free of the free edge of the sheet 31 adjacent the open end 38A of the resultant container. The flaps 41 can be printed, folded over as above described, or provided with an opening 40A for the purpose described above.

In any event, and this applies to all the containers described herein, the open end of the bag, after filling, can be closed by a heat seal, illustrated in FIG. 10 at 42.

Another variation of the container of the present invention is one in which the first and second materials are juxtaposed in face-to-face position with two edge extremities parallel to each other but separated by a given amount. In other words, one of the sheets is wider than the other in one direction, and the other is centered thereon resulting in two marginal portions of the one material free of the other.

In connection with the disclosure set forth immediately above, the example is disclosed in FIG. 11 where two edges of paperboard as the second material extend beyond two corresponding edges of polyethylene film as the first material. The polyethylene is then bonded to the second material along the free edges of the film material. Other bonds extend perpendicular to the aforementioned bonds.

Thus, in connection with the disclosure immediately above, FIG. 11 illustrates a method of manufacturing a container in which both edges 44A and 44B of the film material 31 are spaced equally inward of the edges 45A and 45B of the paperboard material 32. Sealers such as heat seal rollers 46 produce two continuous, elongated seals 47 which bond 31 to 32 parallel to the length of the webs. Cross or transverse seals 48 are then made transversely in a similar way, also bonding 31 to 32 along widely spaced, parallel strips.

By omitting the cross seals 48, and instead, severing the sheets 31–32 at these transverse lines, open-ended containers can be obtained.

Score lines 50 may be provided in the manner described above, and again a knife 36 shears off each container, but this time just "below" the cross seals to provide finished containers 52 in which the top and bottom edges 55 and 56 represent the equal extremity (colineal) edges of the first material 31 and the second material 32. The open end of this container is represented at 58, FIG. 12.

This procedure shown in FIG. 11 again forms a container with three sides bonded and a fourth side unbonded to afford an open end for filling. The container or actual bag dimensions are, by this process, limited to the edge extremities of the first material, that is, the thermoplastic film mentioned, and the second or stiffer backing material has marginal portions which extend beyond the corresponding edge extremities of the first material for purposes to be mentioned.

The extra material afforded by having the paperboard sheet wider on both sides in comparison to the plastic film results in a container 52, FIG. 12, having stand-up flaps 32A and 32B which can be bent back to enable the container 52 to be set stably in an upright position for display on a counter.

FIG. 14 is a somewhat exaggerated view of a container produced by the method of FIG. 11 in which the extremities of the second material 32 are sufficiently beyond the extremities 44A and 44B of the first material 31 (FIG. 11) to permit scoring for complete envelopment and protection of the first material, while at the same time affording a closure overlap 55.

Extra material provided by the extensions 32A and 32B in the paperboard, free of the film material in the modifications described immediately above in connection with FIGS. 11 to 14, may be used for additional printing or die cutting. They may be scored and/or slotted to provide a stand-up display, or folded over to protect the packaged product. These extensions can be secured in any desired position by interlocks, adhesives or the like. The open fourth end of the container may be closed by bonding the first material to the second material parallel to the equal unbonded extremities just below the open end. This open end may also be closed as aforesaid by having resort to the score line 50, FIG. 12, in the second material adjacent the open end, and of any desired distance from said open end, enabling the first and second materials to be folded at such score line to overlie the open end of the bag, such folding providing a flap which may be secured by either stapling or bonding.

Gussets can be afforded for enlarged receptacles or containers in accordance with the present invention. Such gussets may be either of two separate forms. In the first form, the gusset is so arranged as to provide a single bottom gusset. It is possible to form such a bottom gusset during the assembly of the first and second materials, but for simplicity of manufacture, it is preferred to use thermoplastic film material such as polyethylene as preformed gusseted tubing for the first material.

The gusseted tubing may be of standard type commonly extruded into a seamless tube, or it may be a formed tube. In any event, the gusseted tube includes what can be designated as upper and lower gusset flaps. Under the present invention, the lower gusset flap is that portion of the gusset nearest the second or more rigid material, and the upper gusset flap is that portion of the gusset which is outermost of the second material.

Referring to FIGS. 15 to 20, the first material is gusseted polyethylene 31G, FIG. 16, superimposed on the second material, which is paperboard as aforesaid. The two are of the same width, but the sheet 31G was originally of closed tube, double gusseted from 31G', FIG. 15, slit along the center line shown in FIG. 15 to provide two sheets or webs 31G' each having a single gusset. Alternatively, the first material could be a flat sheet folded upon itself to afford the gusset or pleat. The second material is paperboard 32.

The first material, the film 31G, is placed in web form in position for bonding to the second material 32, and the gusset 60 is so positioned that the gusset crease is parallel to the open end and to the bottom, being nearest the open end. When the gusset is opened or expanded to its limits, it will form an expansive bottom for the related container.

The lower gusset flap may be sealed to the second material to affix it firmly thereto and to facilitate this it may be advantageous, as shown in FIG. 19, to so form the tubing that what will be the lower gusset flap 60L will protrude beyond what will then become the upper gusset flap 60U. In other words, the gusset flaps are asymmetrical, enabling the lower gusset flap to be placed directly under a heat sealer 62 incidental to bonding the materials without interference from the upper gusset flap. Of course the upper gusset flap could be mechanically removed from the path of the sealer to permit access of the sealer to the lower gusset flap.

Transverse seals 67 are provided to complete closure on three sides of the containers 68 produced by this process and each having the usual open end, this time at the end of the container opposite the gusseted bottom.

As usual, the second material, the more rigid one, can be scored for folding, and closure of the open end may be by any of the means previously mentioned.

In the second variation of the gusseted container (see FIG. 22) the first and second materials may have two equal edge extremities and two unequal edge extremities, although both materials may have four equal sides in the general disposition exemplified by FIG. 17. The form having unequal edge extremities is the one illustrated in FIG. 22, and these unequal edge extremities will be referred to as the sides of the first material and the sides of the second material.

The first material is, for example, a gusset tube 31GT of polyethylene film with two gussets 70 and 71 parallel and opposite each other, and the second material 32 is, for example, paperboard coated with polyethylene as in all the foregoing embodiments. The tube 31GT is identical to the tube 31G', FIG. 15, prior to slitting.

The first material 31GT in web form is positioned on the second material 32 in web form in such a way that the gussets are parallel to the free edges of the second material, noting that the tube 31GT in its flattened or unexpanded state is narrower than the web of second material 32.

By means previously mentioned for sealing the aforesaid bottom gusset flap 60L, the side gussets 70 and 71 are each bonded at 73 and 74 to the second material by heat sealing what are the lower gusset flaps 70L and 71L to the second material along the seal. Thus, the lower gusset flaps 70L and 71L preferably project beyond the upper gusset flaps 70U and 71U. The seals 73 and 74 are continuous along the length of the webs.

The first material, the gusseted thermoplastic film tube 31GT, is sealed along spaced areas 76 transverse to the seals 73 and 74, noting that the gussets are sealed together, to themselves and to the second material at the ends of the seal 76.

As in FIG. 21 the knife 36 is effective just "below" the seal 76 to provide an open end or edge 81 in the resultant container 80. Thus, the fourth edge is unbonded to provide a container 80 having an open end 81, and the second material may be scored, slotted, or die cut as previously mentioned. Final closure of the fourth edge may be accomplished by any of the means mentioned above.

Another variation of a container produced in accordance with the present invention is illustrated in FIGS. 24 and 25, wherein the bag or container 90 is produced in the manner of producing the container illustrated in FIG. 7, except that the folded flap 91, FIG. 24, extends completely over the sheet of first material 95 and is affixed by a staple 96 to the paperboard backing 97, FIG. 25.

The package 90 shown in FIG. 24 is particularly adapted to be processed by direct mailing machines since the package is generally flat configuration, even when the container is filled with goods such as the granular material 98, as shown in FIG. 25. The flap 91 is formed by bending downwardly that portion of the paperboard backing 97 at a fold line 99, FIG. 25. Inasmuch as the front flap 91 is secured only along the bottom peripheral edge of the container by staples or a narrow width heat seal, the protective cover 91 can be readily pulled loose to expose the goods 98 within the container. The container 90 advantageously conceals the goods so that when the container is opened, the viewer immediately receives a visual impact of the goods. Additionally, the protective flap 91 forms a protective cover for the goods in the container, and provides a convenient addressing, stamp-receiving or printed matter displaying portion.

Preferably, the container 90 is formed with a tube of thermoplastic material with a rear panel 101 disposed in face to face relationship with the backing 97 so as to provide a liner of plastic film so as to resist bending stresses and to provide a somewhat yieldable or stretchable liner for affording additional support for the goods to be packaged. Thus, the container 90 is of increased strength and can be subjected to handling by direct mailing machines and processes without breaking.

As hereinbefore pointed out, each of the flap portions such as the flaps 41 of FIG. 8, the flap 39 of FIG. 6, the flaps 32A and 32B of FIG. 14 may be folded over and secured to the package or container as by heat sealing to provide protective flaps for the material disposed in the container. Those flaps also function in the manner of flap 91 of FIGS. 24 and 25 to provide an area for addressing containers for direct mail processing or the like. Thus, the containers of the present invention are particularly adapted, because of their construction.

As noted above, the containers may be scored to enable the same to be folded along the score lines, and the scoring means can be one operating either on the pressure principle or on a heat principle. Thus, the score lines may be provided by elements having hot edges, in which event the score lines are provided without any particular pressure deformation of the second, more rigid material. Moreover, the second more rigid sheet, particularly in the instance of the second material heavily coated with plastic, or a relatively rigid plastic sheet itself as the second material, can be deformed by a hot die to provide a cavity or pocket substantially complemental to the geometry or the shape of the articles to be packaged.

While the present invention has been described from the standpoint of the preferred materials, polyethylene film and somewhat more rigid paperboard coated with polyethylene film, to develop heat seals as the preferred bonds between the materials, other film materials can be used capable of compatible sealing or bonding including Saran, Pliofilm and polypropylene as the first material, any one of which film materials is heat sealable to paperboard coated with one of these materials or with polyethylene, and sheets of foam plastic, as the more rigid material, compatible with any of the films mentioned. These are among the proprietary-name film materials, and obviously other, equivalent materials are yet to be developed or marketed.

I claim:

1. A generally flat container formed of flexible materials adapted to be filled with goods and adapted to be directly processed by direct mailing machines comprising juxtaposed substantially rectangular sheets of first and second materials, said first material being a sheet of thermoplastic film, and said second material being comparatively more rigid to lend support to said film, said film being bonded to said second material along at least two edged portions to afford an open ended container, said second material being longer than said first material and having a fold line substantially dividing said second material into two substantially equal portions, one of said portions defining a flap portion on said second material adapted to be folded over said first material to provide a flap extending over substantially all of said first material and the goods disposed therein, and means for securing the bottom edge portion of said flap to the generally flat container, said flap adapted to facilitate mailing of the container.

2. The container of claim 1 wherein said first material is a sheet of transparent thermoplastic film, and wherein said second sheet of material is paperboard for forming said flap which is adapted to receive stamps or mailing information thereon.

3. A generally flat container of flexible material adapted to be filled with goods, and adapted to be processed for direct mailing while filled with said goods comprising first and second sheets of different materials, of which the first material is a tube of thermoplastic film presenting a closed bottom and a pair of panels and of which the second material is a sheet of material stiffer than the first material, said first material being juxtapositioned on said sheet of second material so that one of said panels of said first material serves as a lining for the sheet of second material to prevent buckling of said second material by said goods disposed between the pair of panels, said second sheet of material being longer than said first sheet of material in at least one direction, said sheet of second material being bendable about a fold line substantially dividing said second material into two equal portions, one of said portions defining a flap portion extending across said sheet of first material in said first direction, said flap portion adapted to be folded over said first material to provide a protective flap for said first material and goods disposed in said container.

4. The container of claim 3 wherein securing means are provided to secure said flap to said container and thereby hold said protective flap over the goods disposed in said container.

5. A generally flat container of flexible materials comprising: juxtaposed substantially rectangular and substantially flat sheets of first and second materials, the first material being a sheet of thermoplastic film having a gusset formed therein inclusive of two gusset flaps joined along a fold line, said second material being more rigid than said first material to lend support to said film, said film being bonded to said second material along at least two marginal portions to afford an open ended pocket opposite said gusset, said sheet of second material being longer than said sheet of said first material and extending at said open ended pocket to form a flap portion for bending to a position to close said open ended pocket.

6. The container according to claim 5 wherein the gusset includes two gusset flaps in the bottom of the container and of which one lies adjacent the second material and protrudes beyond the other gusset flap, a portion of said one gusset flap being bonded to the second material.

References Cited by the Examiner

UNITED STATES PATENTS

| | | | |
|---|---|---|---|
| 791,362 | 5/1905 | Parmenter | 229—69 |
| 1,782,884 | 11/1930 | Royal | 93—35 |
| 1,907,675 | 5/1933 | Rosen | 229—87 X |
| 2,062,265 | 11/1936 | Haskell | 93—45 |
| 2,298,421 | 10/1942 | Salfisberg. | |
| 2,805,814 | 9/1957 | Calasibetta et al. | 229—56 |
| 2,987,402 | 6/1961 | Dold | 229—87 X |
| 3,024,962 | 3/1962 | Meister | 229—62 |
| 3,026,016 | 3/1962 | Scher | 229—55 |
| 3,070,278 | 12/1962 | Korn | 229—62 |

JOSEPH R. LECLAIR, *Primary Examiner.*

GEORGE O. RALSTON, FRANKLIN T. GARRETT,
*Examiners.*